(12) United States Patent
Basmov et al.

(10) Patent No.: US 9,104,857 B2
(45) Date of Patent: Aug. 11, 2015

(54) GESTURE-BASED AUTHENTICATION WITHOUT RETAINED CREDENTIALING GESTURES

(71) Applicant: Microsoft Corporation, Redmond, WA (US)

(72) Inventors: Innokentiy Basmov, Redmond, WA (US); Jeffrey Jay Johnson, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 78 days.

(21) Appl. No.: 13/918,864

(22) Filed: Jun. 14, 2013

(65) Prior Publication Data

US 2014/0373132 A1    Dec. 18, 2014

(51) Int. Cl.
*G06F 21/00* (2013.01)
*G06F 21/36* (2013.01)
*G06F 21/31* (2013.01)

(52) U.S. Cl.
CPC .............. *G06F 21/36* (2013.01); *G06F 21/31* (2013.01)

(58) Field of Classification Search
None
See application file for complete search history.

(56) References Cited

U.S. PATENT DOCUMENTS

| 8,209,637 | B2 | 6/2012 | Chaudhri et al. |
| 2004/0230843 | A1 | 11/2004 | Jansen |
| 2005/0044425 | A1* | 2/2005 | Hypponen ................. 713/202 |
| 2010/0082990 | A1* | 4/2010 | Grigorovitch ............. 713/176 |
| 2011/0187497 | A1* | 8/2011 | Chin ........................ 340/5.54 |
| 2012/0066650 | A1 | 3/2012 | Tirpak et al. |
| 2013/0047252 | A1 | 2/2013 | Johnson et al. |

FOREIGN PATENT DOCUMENTS

| EP | 2166487 A2 | 3/2010 |
| EP | 2482217 A1 | 8/2012 |
| WO | 03/48909 A2 | 6/2003 |

OTHER PUBLICATIONS

"International Search Report & Written Opinion for PCT Patent Application No. PCT/US2013/060498", Mailed Date: Dec. 6, 2013, Filed Date: Sep. 19, 2013, 9 pages.

"Sign in with a Picture Password—Microsoft Windows", Retrieved from <http://windows.microsoft.com/en-IN/windows-8/picture-passwords#1TC=t1> on Mar. 12, 2013, (Feb. 12, 2013), 2 pages.

(Continued)

*Primary Examiner* — Ghazal Shehni
(74) *Attorney, Agent, or Firm* — Timothy Churna; Kate Drakos; Micky Minhas (57) ABSTRACT

This document describes techniques and apparatuses enabling gesture-based authentication without retained credentialing gestures. The techniques are capable of determining an identifier for a credentialing gesture where the identifier can be reproduced on receiving a similar authentication gesture at a later time. The identifier for the credentialing gesture can be encrypted, sent to a secure authentication entity, and then, when an authentication gesture is received, an identifier for the authentication gesture can also be determined, encrypted, and sent to the secure authentication entity. If the secure authentication entity determines that the encrypted identifiers match, the user is authenticated.

20 Claims, 9 Drawing Sheets

(56) References Cited

OTHER PUBLICATIONS

Henry, Alan "Picture Password Lockscreen Keeps Your Android Phone Secure, May Be the Last Lock Screen You Ever Install", Retrieved from <http://lifehacker.com/5957570/picture-password-lockscreen-keeps-your-android- phone-secure-may-be-the-last-lock-screen-you-ever-install> on Mar. 12, 2013, (Nov. 2, 2012), 2 pages.

Jansen, Wayne "Authenticating Mobile Device Users Through Image Selection", Retrieved at <http://csrc.nist.gov/_groups/SN_S/mobile_security/documents/mobile_devices/PP-VisualAuthentication-rev-DS04. pdf>, (May 2004), 10 pages.

Ritter, et al., "MIBA: Multitouch Image-Based Authentication on Smartphones", Forthcoming Conference on the CHI, Available at <http://www.uni-ulm.de/fileadmin/website_uni_ulm/iui.inst.100/institut/Papers/Prof_Weber/2013-CHI-EA-miba.pdf>,(Apr. 27, 2013), 6 pages.

Sinofsky, Steven "Signing In with a Picture", Retrieved from <http://blogs.msdn.com/b/b8/archive/2011/12/16/signing-in-with-a-picture-password.aspx> on Mar. 14, 2013, (Dec. 17, 2011), 22 pages.

Sinofsky, Steven "Optimizing Picture Password Security", Retrieved from <http://blogs.msdn.com/b/b8/archive/2011/12/19/optimizing-picture-password-security.aspx> on Mar. 14, 2013, (Dec. 19, 2011),20 pages.

* cited by examiner

Radius = 7.5
Center Grid Location = [68,21]
Shift from Center = [+0.07, -0.19]
Clockwise = 0

GESTURE-BASED AUTHENTICATION WITHOUT RETAINED CREDENTIALING GESTURES

BACKGROUND

Current gesture-based authentication techniques retain credentialing gestures that can later be used to authenticate a user's identity. When a user wishes to logon or access some resource needing authentication, the user inputs authentication gestures in an attempt to authenticate himself or herself. These current techniques compare the retained credentialing gestures to the user's authentication gestures and, based on various criteria, authenticate or reject the user.

Retaining these credentialing gestures, however, introduces a security risk to the device or resource being accessed, such as a user's laptop or smartphone. If a malicious actor is able to access a device's memory, or in some way intercept a credentialing gesture, the malicious actor can input an authentication gesture matching that credentialing gesture, thereby allowing the malicious actor full use of the device or resource.

SUMMARY

This document describes techniques and apparatuses enabling gesture-based authentication without retained credentialing gestures. The techniques are capable of determining an identifier for a credentialing gesture where the identifier can be reproduced on receiving a similar authentication gesture at a later time. The identifier for the credentialing gesture can be encrypted, sent to a secure authentication entity, and then, when an authentication gesture is received, an identifier for the authentication gesture can also be determined, encrypted, and sent to the secure authentication entity. If the secure authentication entity determines that the encrypted identifiers match, the user is authenticated. In this and other manners, the techniques forgo retaining a credentialing gesture while permitting gesture-based authentication.

This summary is provided to introduce simplified concepts for gesture-based authentication without retained credentialing gestures, which is further described below in the Detailed Description. This summary is not intended to identify essential features of the claimed subject matter, nor is it intended for use in determining the scope of the claimed subject matter.

BRIEF DESCRIPTION OF THE DRAWINGS

Various embodiments of enabling gesture-based authentication without retained credentialing gestures are described with reference to the following drawings. The same numbers are used throughout the drawings to reference like features and components.

DETAILED DESCRIPTION

Overview

This document describes techniques and apparatuses enabling gesture-based authentication without retained credentialing gestures. The techniques determine identifiers for credentialing and authentication gestures that can be cryptographically secured and, in many cases, permit identical identifiers for gestures that are similar but not identical. By so doing, credentialing gestures do not need be retained or otherwise left susceptible to malicious actors.

Consider, for example, gesture-based authentication that uses a personalized digital image as a guide for a user's gestures. While not required for use of the techniques, personalized digital images can increase a user's accuracy and help the user remember how to make the gestures and the order of the gestures. Here assume that a user selects a photograph of her children at a park to use as a gesture-authentication image. Assume that the user inputs the following credentialing gestures: a tap gesture on her six-year-old daughter's nose, a circle gesture around a soccer ball, and a line gesture along a baseball bat being held by her twelve-year-old son. The techniques can determine an identifier for each of these credentialing gestures, encrypt the identifiers, and send the encrypted identifiers to an authenticator for later use. Then, when the user later wishes to logon to her smartphone, for example, she is presented with the same picture of her children. She enters gestures over the image, including the tap gesture on her daughter's nose, the circle gesture around the soccer ball, and the line gesture along her son's baseball bat. On receiving these gestures, the techniques determine identifiers for the gestures, encrypt them, and send them to an authenticator. The authenticator then authenticates the user or rejects the user's attempt to login. Throughout this example, no credentialing gestures, or even authentication gestures, need be retained or transmitted.

This is but one example of how techniques and/or apparatuses enabling gesture-based authentication without retained credentialing gestures can be performed. Techniques and/or apparatuses that enable gesture-based authentication without retained credentialing gestures are referred to herein separately or in conjunction as the "techniques" as permitted by the context. This document now turns to an example environment in which the techniques can be embodied, followed by various example methods for performing the techniques, after which an example device in which the techniques may be embodied is described.

Example Environment

Figure 1:
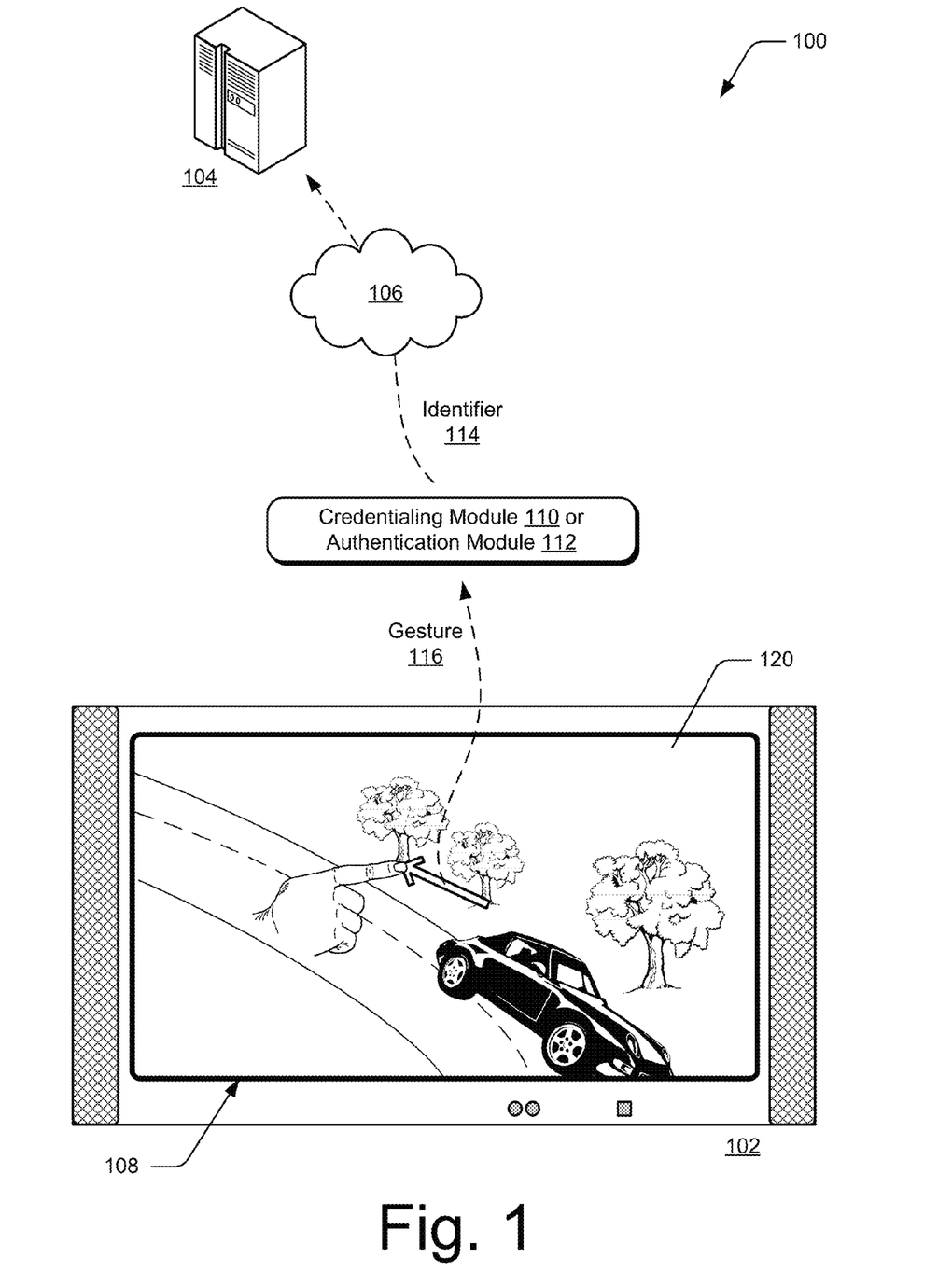
FIG. 1 illustrates an example environment in which techniques enabling gesture-based authentication without retained credentialing gestures can be implemented.

FIG. 1 is an illustration of an example environment 100 in which techniques for gesture-based authentication without retained credentialing gestures can be embodied. Environment 100 includes a computing device 102, an authenticator 104, and a communications network 106. The techniques can be performed and the apparatuses embodied, in whole or in part, by one or both of computing device 102 and authenticator 104 as will be described below.

Generally, computing device 102 enables entry of credentialing or authentication gestures over a display 108 associated with computing device 102. Gestures are received by a credentialing module 110 or an authentication module 112, depending on whether the gesture is for credentialing or authenticating. In both cases, however, an identifier 114 can be determined for a gesture 116 that is received.

As shown in environment 100, image 120 includes various features that may aid the user in making and remembering gestures, such as three trees, a road, and a car. Here gesture 116 is a line gesture made from a base of one tree to a base of another tree. Ways in which images and features of them can be used are described in greater detail below, though they are not required for use of the techniques.

After determining identifier 114, credentialing module 110 or authentication module 112 passes identifier 114 to authenticator 104. Note that identifier 114 is capable of being encrypted such that it is secure for transmission to authenticator 104.

Figure 2:
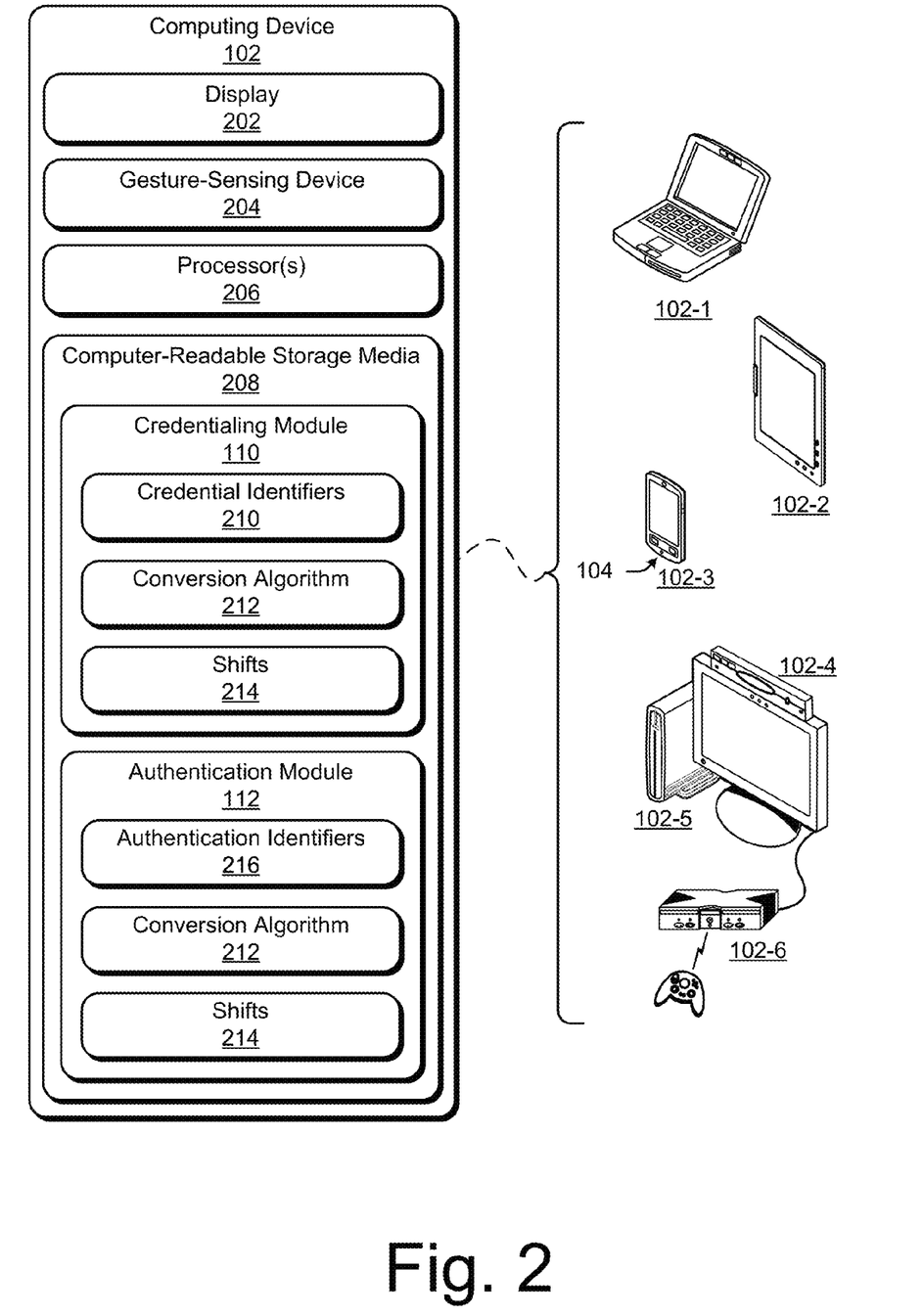
FIG. 2 illustrates an example computing device of FIG. 1.

In more detail, consider FIG. 2, which illustrates computing device 102. Computing device 102 can each be one or a combination of various devices, here illustrated with six examples: a laptop computer 102-1, a tablet computer 102-2, a smartphone 102-3, a set-top box 102-4, a desktop 102-5, and a gaming system 102-6, though other computing devices and systems, such as televisions with computing capabilities, netbooks, and cellular phones, may also be used.

Computing device 102 includes or is able to communicate with a display 202 (four examples are shown in FIG. 2 and one, display 108, is shown in FIG. 1), a gesture-sensing device 204, one or more processors 206, and computer-readable storage media 208 (media 208). Gesture-sensing device 204 is capable of sensing gestures and can be as simple as a portion of an operating system of computing device 102, such as one that records movement of a mouse pointer. Gesture-sensing device 204 may include, however, separate or integral devices with computing device 102 or display 202, such as a touch-sensitive display, a movement tracker (e.g., cameras) capable of tracking body, arm, finger, stylus movements and selections, a track pad, and so forth.

Media 208 includes credentialing module 110 and authentication module 112. Credentialing module 110 is capable of determining credential identifiers 210 for multiple received credentialing gestures. Credentialing module 110 may determine credential identifiers 210 using a conversion algorithm 212. This conversion algorithm 212 is sufficiently repeatable to at least reproduce a same identifier for a same gesture and, as described as part of numerous methods below, determining identical identifiers for non-identical gestures through use of grid sizes and shifts 214. Shifts 214 are described in part immediately below and in detail in the methods section.

Authentication module 112 is capable of determining authentication identifiers 216 for authentication gestures. In some cases, authentication module 112 uses shifts 214, which may be non-encrypted (sometimes called "in the clear"). Authentication module 112 may also use conversion algorithm 212 to determine identifiers, here authentication identifiers 216. In doing so, authentication module 112 may offset a received location of an authentication gesture based on shifts 214 to compute a grid location, which is then used in building authentication identifiers 216. These authentication identifiers 216 can then be encrypted and provided to an authenticator effective to enable the authenticator to authenticate a user based on gestures received.

The credentialing and authentication gestures can be received in various fashions, such as over a personalized digital image associated with a user. An image may also or instead be a photograph taken by the user, which further aids a user's memory (it is often easier for a user to remember features of an image that the user cares about), as well as adding security.

Regarding a user's memory, a photograph may include features, such as a line feature and a circle feature, which can aid a user in selecting credentialing gestures (and later authentication gestures) using those features. Thus, the example user's photograph with her son's baseball bat has linear features that may aid the user in performing a linear gesture along the bat, or the soccer ball, because it is round, has a circular feature aiding a user in performing a circular gesture around soccer ball.

Regarding security, some malicious attacks are intended, not for a particular person's account or device, but for use across many devices. In such a case, an image that is unique to a person makes more difficult some types of attacks, especially brute-force attacks (e.g., hammering attacks). For example, a brute-force attack on an image having five fixed objects, a square, circle, triangle, dot, and star that all or many users use for entry of gestures, can focus on drawing lines between these fixed objects' locations. In contrast, personal images do not have objects that are common to many different persons' authentication images, and so personal images can make some attacks more difficult.

While line, circle, and tap gestures made over personal images are given as examples, many other gestures can be used, such as gestures received through arm movements (even a person dancing in a certain way can be received as gestures for credentialing and authentication), freeform drawings made over a blank display, lines drawn between icons or dots, and so forth.

Identifiers are capable, alone or in combination, of being cryptographically secured, which may be performed by credentialing module 110 or authentication module 112. Identifiers are not required to be, but can be alpha-numeric strings, integers, and so forth. After encryption, the identifiers are provided to an authenticator (e.g., authenticator 104 of FIG. 1), which may be remote to computing device 102, through it may instead be integral with or local to computing device 102.

Authenticator 104 of FIG. 1 is capable of authenticating authentication identifiers against credential identifiers. For example, identifiers can be numeric and hashed. Thus, hashed credential identifiers stored or accessible by authenticator 104 can be compared to hashed authentication identifiers to authenticate a user.

These and other capabilities, as well as ways in which entities of FIGS. 1 and 2 act and interact, are set forth in greater detail below. These entities may be further divided, combined, and so on. The environment 100 of FIG. 1 and the detailed illustration of FIG. 2 illustrate some of many possible environments capable of employing the described techniques.

Example Methods

Figure 3:
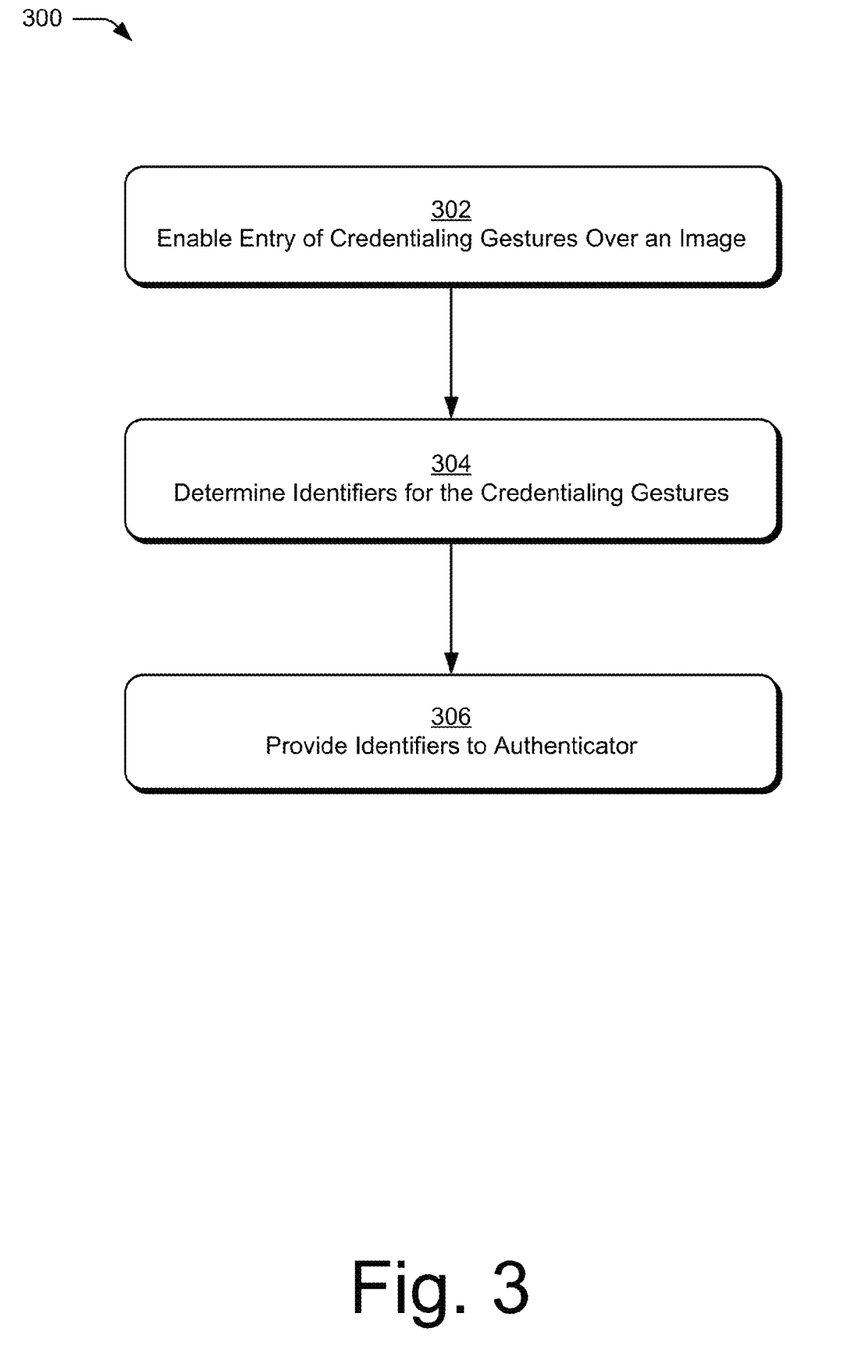
FIG. 3 illustrates example methods for determining credential identifiers based on credentialing gestures, the credential identifiers later usable as part of gesture-based authentication without retained credentialing gestures.

FIG. 3 depicts example methods 300 for determining credential identifiers based on credentialing gestures. These credential identifiers can later be used as part of gesture-based authentication without retained credentialing gestures. These and other methods described herein are shown as sets of blocks that specify operations performed but are not necessarily limited to the order shown for performing the operations by the respective blocks. In portions of the following discussion reference may be made to environment 100 of FIG. 1 and entities detailed in FIGS. 1 and 2, reference to which is made for example only. The techniques are not limited to performance by one entity or multiple entities operating on one device.

Block 302 enables entry of credentialing gestures over an image. Block 302 may act responsive to enabling selection of, and a user selecting an image from, images of a group, such as a user's photograph library on his or her device. Images are not required, nor are personalized images, though the ongoing examples are generally directed to gestures made over images.

Block 304, responsive to receiving credentialing gestures, determines identifiers for the credentialing gestures. As noted in part above, the identifiers can each be mapped, one-to-one, to their respective credentialing gestures, though multiple credentialing gestures can be mapped to a single identifier, or some combination of gestures can be performed for some non-one-to-one mapping between identifiers and gestures. Block 304 may determine identifiers using a repeatable conversion algorithm such that identifiers can later be reproduced on performance of some future gesture.

Block 306 provides the identifiers to an authenticator capable of performing the repeatable conversion algorithm as part of a gesture-based user-authentication process.

Figure 4:
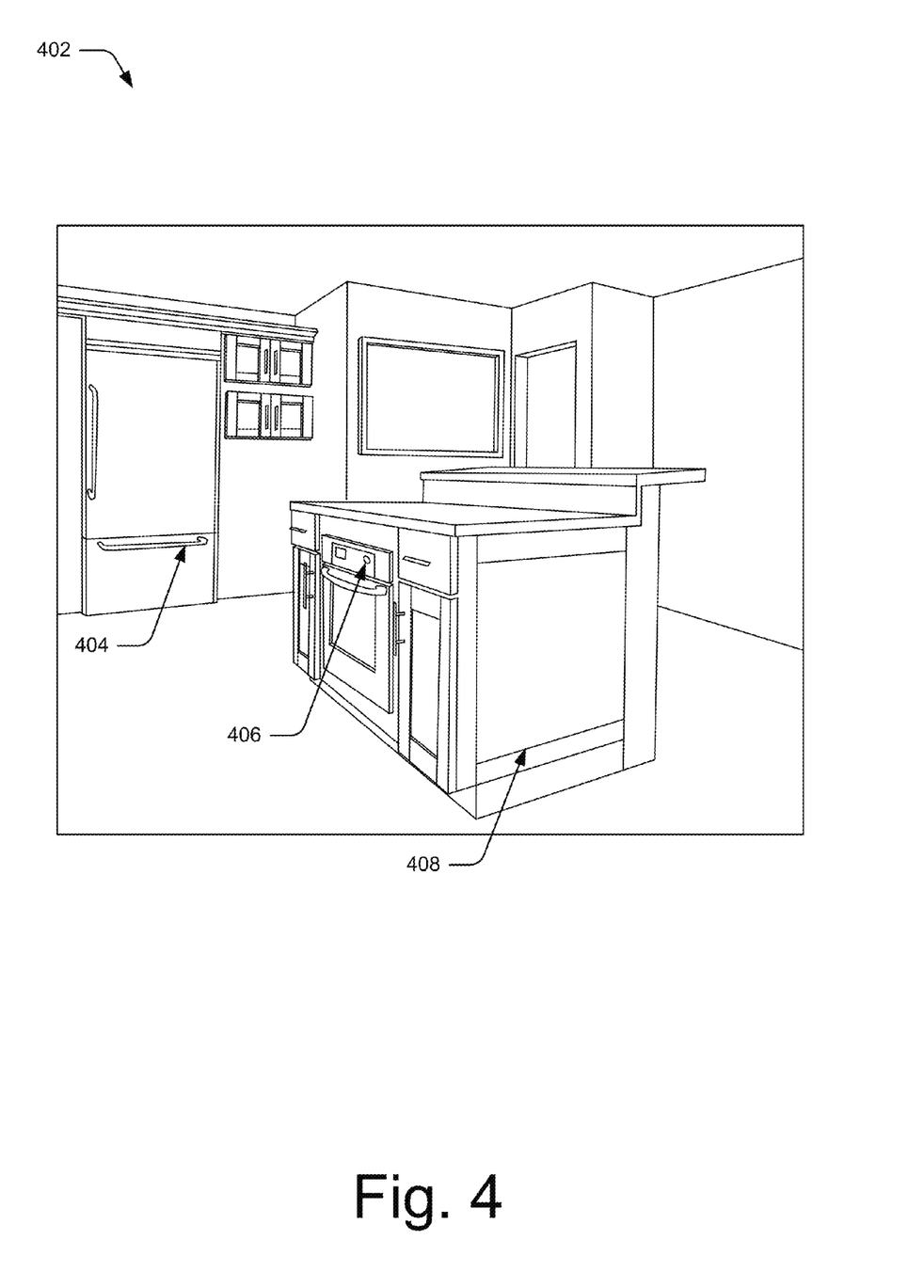
FIG. 4 illustrates a personalized digital image having features over which gestures can be made.

As part of an ongoing example, consider FIG. 4, which illustrates a personalized digital image 402. Assume, for this example, that image 402 is a user's dream kitchen remodel, which is a photograph of an actual kitchen. Image 402 includes numerous point and line features usable to aid a user in performing a gesture, and some square and rectangular features that can aid a user in making square, rectangular, or circle gestures. For brevity and visual clarity only three of these features are marked, a line feature 404 of a roughly horizontal freezer handle, a point feature 406 of a temperature-setting dial of an oven, and a (roughly) square feature 408 of a wood panel of a side of a kitchen island.

Figure 5:
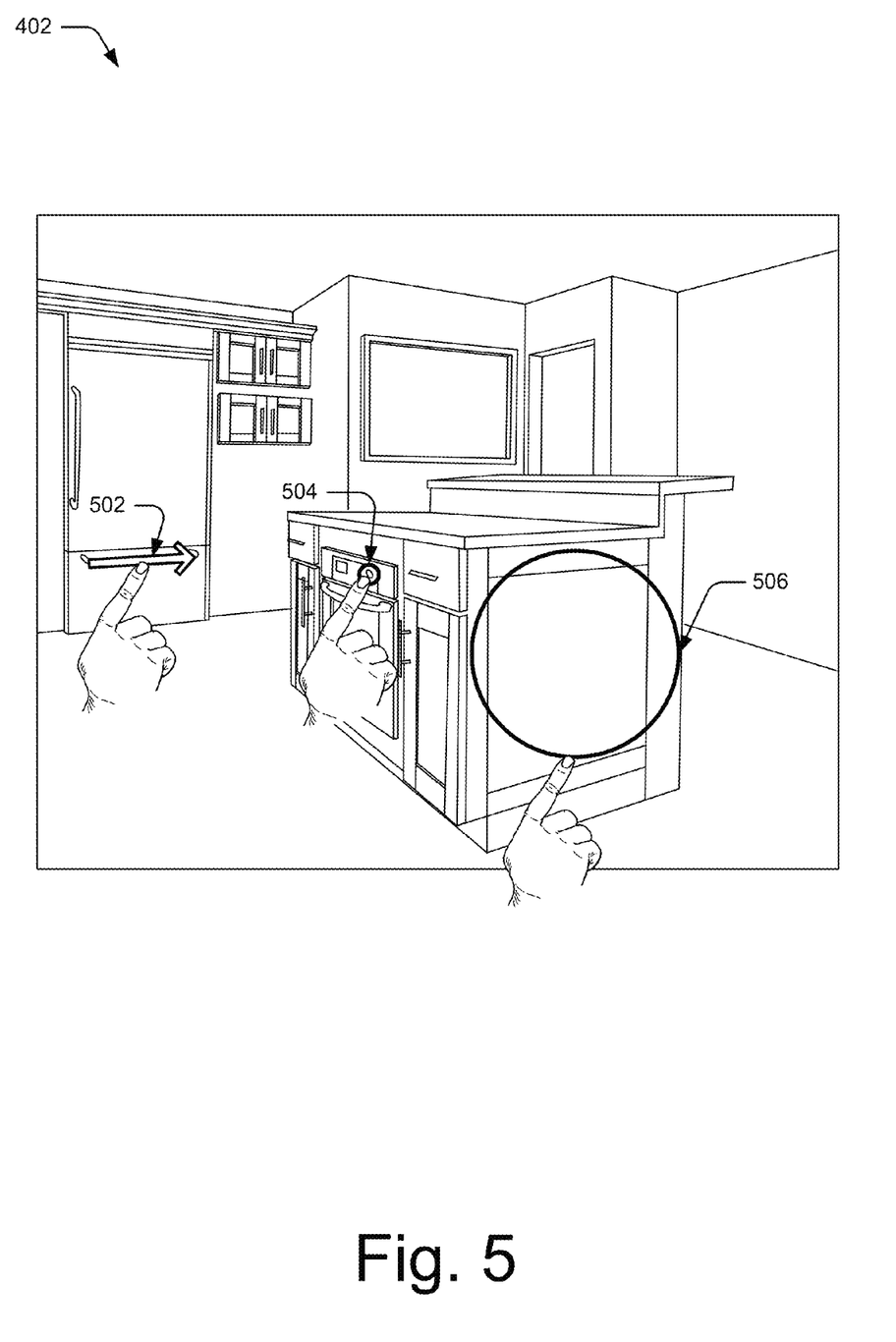
FIG. 5 illustrates example line, tap, and circle credentialing gestures made over the personalized digital image of FIG. 4.

By way of example, consider FIG. 5, which illustrates three credentialing gestures received over corresponding image features shown in FIG. 4. A line credentialing gesture 502 is shown made over the horizontal freezer handle of line feature 404, a tap credentialing gesture 504 is shown made over the temperature-setting dial of the oven of point feature 406, and a circle credentialing gesture 506 is shown made over the wood panel of the side of the kitchen island of square feature 408.

To determine credential identifiers for these credentialing gestures 502, 504, and 506, credentialing module 110 may use a grid location of some element or elements of each gesture. Determining an identifier may also determine a shift of some element or elements from the grid location, though the identifier does not include the shift. The shift and grid location are mapped to a received location of a credentialing gesture over an image. This shift is an offset from the received location of one of the credentialing gestures to a center of the grid location.

Figure 6:
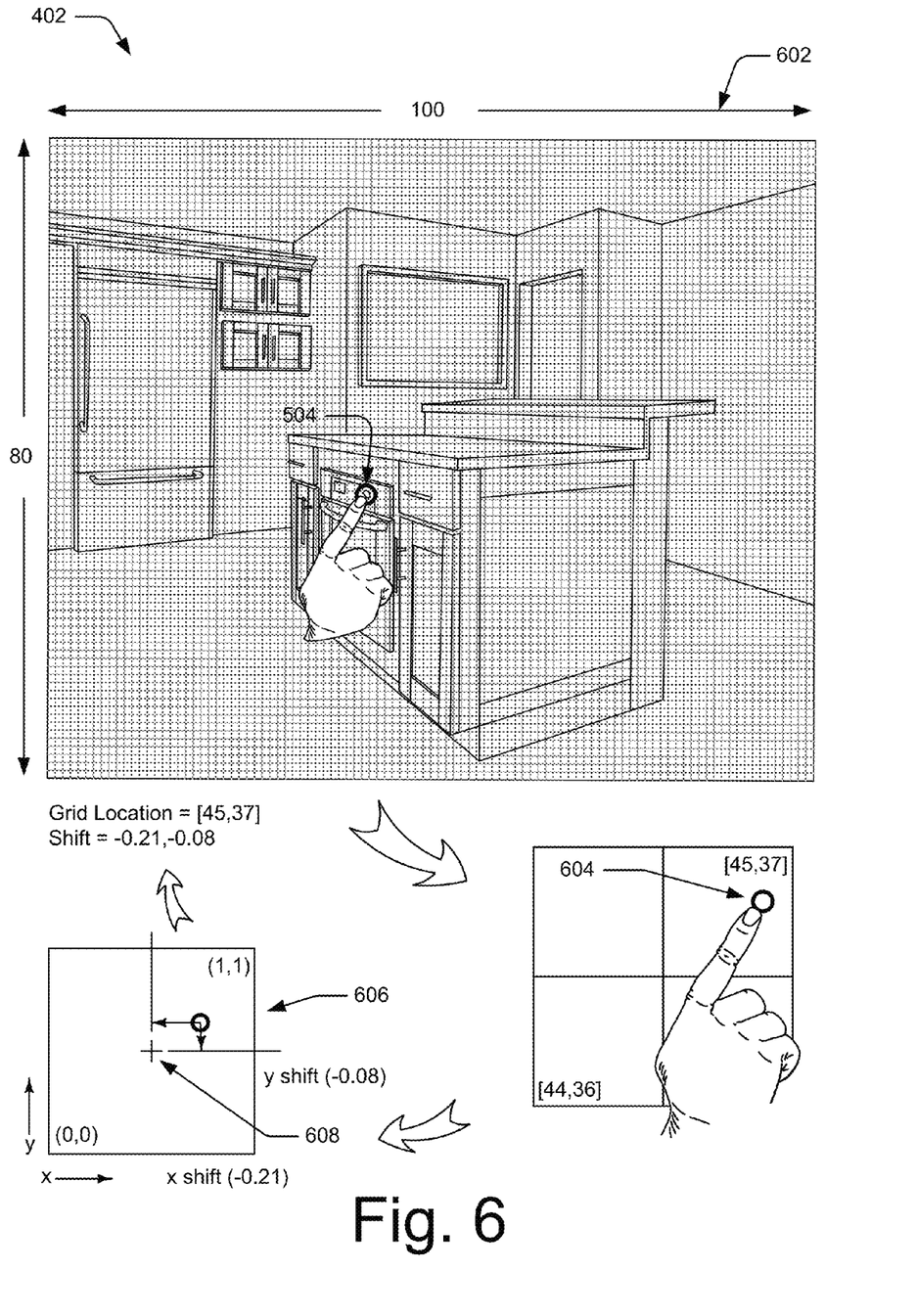
FIG. 6 illustrates a grid over the personalized digital image of FIGS. 4 and 5, a tap credentialing gesture, and a grid location and shift determined for the tap credentialing gesture.

Consider, for example, FIG. 6, which illustrates a grid 602 over image 402, the grid having a resolution of 100 by 80 units (100 on the horizontal, 80 on the vertical). The units of resolution may be any suitable dimension such as pixels, unit of length (e.g. millimeters or inches), scale divisions, area-based resolution (e.g., grid units per inch), and the like. Grid resolutions or sizes can vary, with a greater number of grid locations increasing precision of identifiers determined based on the gestures. Higher precision increases security but may, if too difficult for users, decrease ease of use. Thus, grids can be 20×20 or 2,000×2,000 or more, with screen size, ease-of-use, additional security layers, number or complexity of gestures used, number of authentication attempts permitted, and/or security considerations affecting the chosen size.

Grid resolutions or sizes can be determined by credentialing module 110 and/or authenticator 104, and may be done based on desired precision, ease of use, image size, whether or not a personal digital image or a widely available image is used, screen size, and whether or not additional security procedures are also required for authentication. Larger or smaller resolutions can instead be used to increase ease-of-use or security, respectively. For this example, resolution of grid 602 is 100 by 80, and thus includes 8,000 grid locations.

Consider tap credentialing gesture 504 of FIG. 5, which has a received location 604 that is within grid location [45, 37]. While in some cases this can be deemed sufficient, in this example credentialing module 110 determines a shift as well. Thus, credentialing module 110 determines a tap identifier for credentialing gesture 504 using grid location [45,37] and having a shift 606. Shift 606 is illustrated as the offset from a center 608 of the grid location. The resulting tap identifier is therefore determined to be grid location [45,37], but the grid location has an associated shift: [−0.21,−0.08]. As noted herein, shift 606 does not need to be encrypted, and thus the identifier for tap credentialing gesture 504 can simply be [45,37] or concatenated for encryption as 4,537.

Associating shift [−0.21,−0.08] to this gesture, however, can aid in determining authentication gestures. A tap authentication gesture that is later received, for example, can be shifted, thereby increasing the chances that the received location for the tap authentication gesture is [45,37] and not some other grid location. If a user taps at [46,37], for example, but is on a left side of that grid location, the shift may enable determination that the grid location to be used for determining an authentication identifier is instead [45,37].

Various credentialing gestures can be received and credential identifiers determined, including lines, circles, ovals, ellipses, squares, rectangles, and freeform gestures. Squares and rectangles can be determined similarly to taps or lines, with the corners treated similar to taps or the four lines treated similar to a line as described below. Freeform gestures can be treated as a combination of one or more of taps, lines, arcs, or circles.

Figure 7:
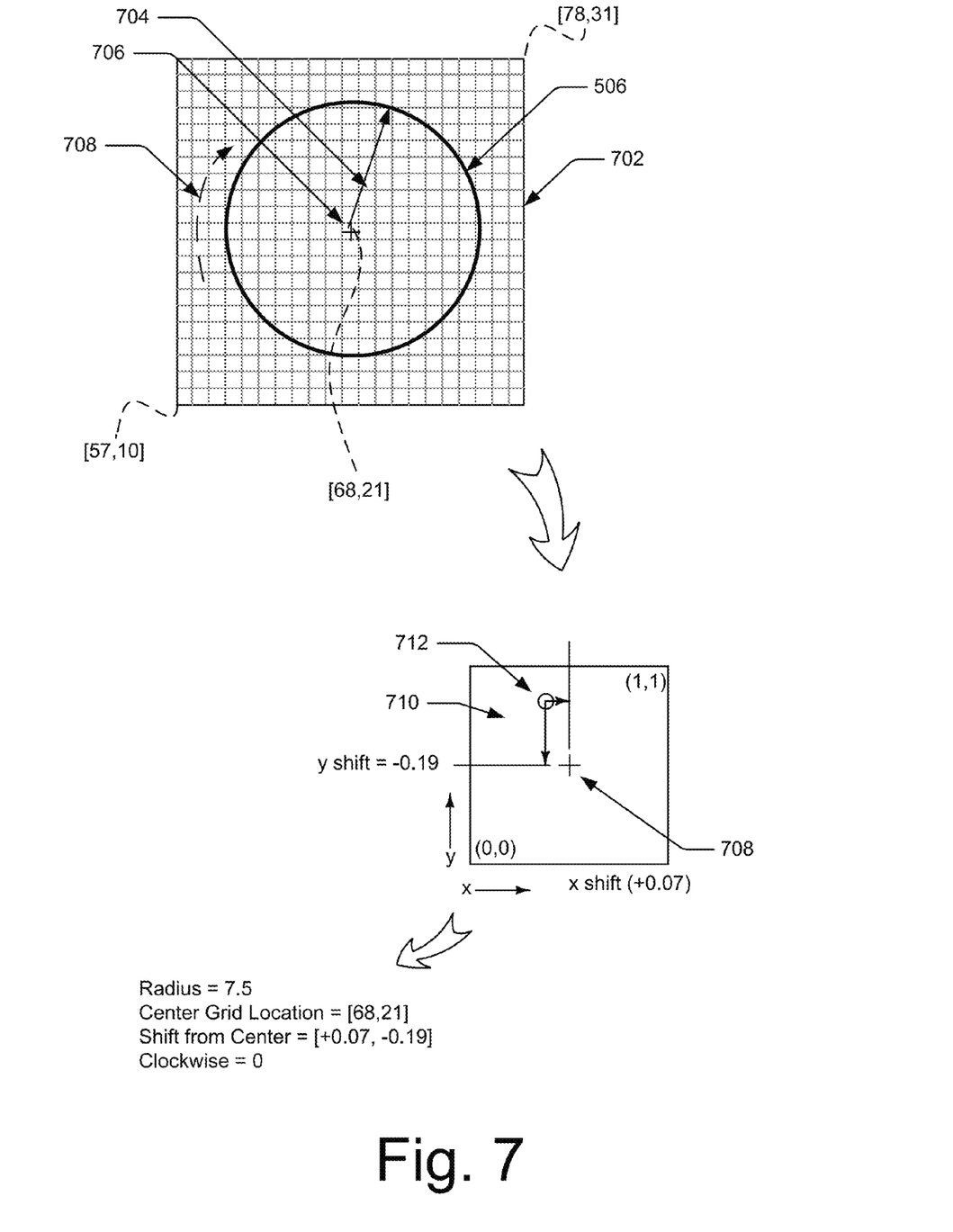
FIG. 7 illustrates a grid portion of the grid of FIG. 6 with the circle credentialing gesture shown in FIG. 5 along with a radius, a center grid location, a shift from center, and a clockwise indictor determined for the circle credentialing gesture.

Continuing the ongoing example, consider FIG. 7, which illustrates a grid portion 702 of grid 602 of FIG. 6 with circle credentialing gesture 506 of FIG. 5. Here credentialing module 110 determines a circle identifier from received locations of circle credentialing gesture 506 using a radius, a center grid location, and a clockwise or counter-clockwise indicator. Radius 704 is calculated to be 7.5 (measured in grid dimensions), with a center grid location 706 of [68,21], and made in a clockwise direction 708 (clockwise set to "0" and counter-clockwise set to "1"). Thus, the circle identifier determined is [68,21,7.5,0] or concatenated for hashing as 6,821,750. While not required, credentialing module 110 may also determine a shift (shown at shift 710) from a received center 712 for circle credentialing gesture 506. Here the shift is measured from an offset from center grid location 706 of the circle credentialing gesture 504 relative to received center 712, and is determined to be [+0.07,−0.19].

While not illustrated, the techniques may determine a line identifier for a line credentialing gesture. In one case, the line identifier is determined based on a first received grid location and a second received grid location (the start and end of the line gesture). An identifier for a line gesture can instead be determined based on the line being treated mathematically as a vector having a length, angle, and/or a starting location. Similarly, a circle gesture can be treated mathematically as a vector (e.g., radius 704), and thus the vector used to build an identifier. Furthermore, locations at which the gestures are received are not required to be in a square grid or any sort of grid. A grid can be hexagonal, or pixels or pixel blocks can be used rather than the grids described. Alternately or additionally, other coordinate systems can be used, such as a polar coordinate system or cylindrical or spherical coordinate system for 3D applications (e.g., optically captured gestures).

Concluding the ongoing example, assume that a line credentialing gesture has two received locations: [10,76] and [24,77]. The corresponding line gesture identifier is then a concatenation of these received locations: 10,762,477. These three identifiers can be concatenated again, such as in the order that the gestures were received, and thus as line gesture identifier 10,762,477 with tap gesture 4,537 and with circle gesture identifier 6,821,750 to be, in total: 1,076,247,745, 376,821,750. As is readily apparent, this is a large number that cannot easily be replicated with a brute force attack. Furthermore, a range of types and gestures can be used, whereby the concatenated identifiers can range from as little as, for three tap gestures, as [XYXYXY], where X is the horizontal grid and Y is the vertical grid, which can be as small as 6 digits. Contrast this with five circle gestures, which can be as large as 45 digits for grids having 100 or more in the X and Y axis, with R=Radius and C=0 or 1:

[XYRCXYRCXRYCXRYCXRYC]

While methods 300 are described in the context of a single identifier determined and provided for each credentialing gesture, in some cases additional identifiers are determined and provided. For a tap credentialing gesture received at [34,12] for example, identifiers can also be determined and provided for some number of locations surrounding the received location, such as those one, two, three, or even more locations away from the received location. Identifiers can be determined for locations one location from (e.g., abutting) the received location, for example, which would be: [33,12], [35,12], [34,11], [34,13] (and the four corner locations from the received location if desired). Thus, a tap authenticating gesture can be determined as set forth below and, if that tap authenticating gesture is at one of these four locations or [34,12], the gesture can be determined to be authentic. This alternative can be applied for each of the various gestures described herein; it is not limited to tap gestures.

Figure 8:
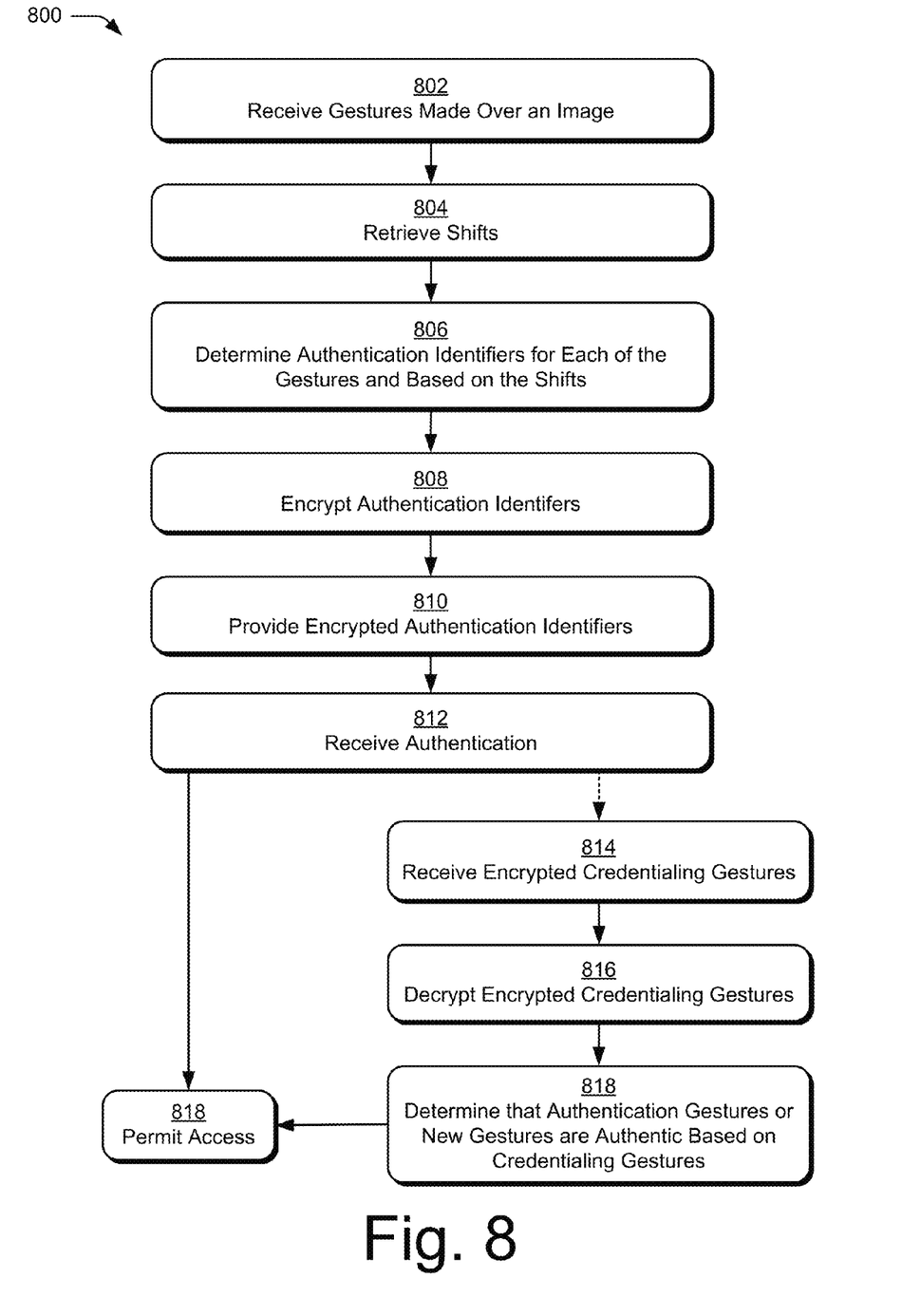
FIG. 8 illustrates example methods for gesture-based authentication without retained credentialing gestures.

FIG. 8 depicts methods 800 for gesture-based authentication without retained credentialing gestures. Methods 800 may be performed without use or local storage of credentialing gestures on which the authentication identifiers are based.

Block 802 receives, as part of a gesture-based user-authentication process, gestures made over an image. As noted, receiving gestures over an image is not necessarily required; blank displays or even gestures received without use of a display may be made (e.g., arm or body gestures). These gestures are received from a user in an attempt to authenticate the user based on those gestures, and may include various types of the gestures noted above.

Block 804 retrieves shifts for each of the gestures made over the image, the shifts associated with a user, device, or resource related to the gesture-based user-authentication process. Shifts can be retrieved in the clear (unencrypted), whether from local storage or remote storage, and prior to or after block 802. To know which set of shifts is associated with the gestures received, some identification of the user or device can be used, such as unique identification associated with a user, device, resource, or account for which access or user authentication is desired. As noted above, shifts are not required for use of the techniques, though their use can permit higher ease of use for users.

Block 806 determines identifiers for each of the gestures based on the shifts. Determining identifiers of authenticate gestures can be performed similarly to, or identically to, those set forth above. Thus, authentication module 112 may use, like credentialing module 110, conversion algorithm 212 of FIG. 2. Some differences may exist; credentialing module 110 may determine shifts 214 while authentication module 112 uses the determined shifts 214. If shifts 214 are not used, however, conversion algorithm 212 acts the same or similarly for credentialing and authentication. Note also that credentialing module 110 and authentication module 112 may be separate or integrated as one entity (e.g., a singular application or module).

Determining identifiers for each of the gestures based on the shifts permits matching of the identifiers with identifiers calculated for previously-received credentialing gestures. In such cases, each of the authentication gestures may not be identical to each of the previously-received credentialing gestures. When the example grid is used, a non-identical difference is permitted that is equal to at least one half of a dimension or resolution of grid location. Thus, for a tap gesture on a display having a 100 by 100 grid where each grid is 4 millimeters by 4 millimeters, a user's tap may miss by as much as 2 millimeters in either or both directions and still result in a same identifier as the credentialing tap gesture.

For example, authentication module 112 of FIG. 1 can shift, for each of the gestures, a received location based on a respective shift of the shifts to produce a grid location used for the identifier. Continuing the example illustrated in FIGS. 4-7, a received location for a tap authentication gesture can be shifted in the X direction by (−0.21) and the Y direction by (−0.08). This is effective to increase the likelihood that a tap gesture received will have a same identifier as an associated credentialing gesture, as it adjusts or compensates for inaccuracies made by users in making gestures. This is especially the case for credentialing gestures received near an edge or corner of a grid location. If a credentialing gesture is received very hear a corner, and thus far from a center of a grid location, an authentication gesture may be found incorrect (if no shift is used) when only slightly off from a previously-received location for the associated credentialing gesture.

Block 808 encrypts the identifiers. Authentication module 112 may encrypt the identifiers in various manners known for encrypting strings, numbers, and so forth. In this ongoing example, authentication identifiers are concatenated in the order received and then hashed.

Block 810 provides the encrypted authentication identifiers to an authenticator effective to enable the authenticator to authenticate the user, device, or resource using the gestures made over the image. As noted in the example of FIG. 1, authenticator 104 may receive encrypted authentication identifiers for authentication gestures, compare them to encrypted credential identifiers, and, if they match, authenticate the user. In more detail, block 810 may provide the encrypted authentication identifiers as an authentication value along with a secret, which is sealed prior to being provided. This protects the secret from being retrieved unless the authentication value is known (which it will by authenticator 104 so long as the authentication identifiers match the credential identifiers).

Block 812 receives an authentication, or indication thereof, from the authenticator if the encrypted authentication identifiers match encrypted credential identifiers. If the encrypted authentication identifiers do not match the encrypted credential identifiers, authenticator 104 and/or authentication module 112 may increment a lockdown-counter to protect the authentication process from hammering attacks.

If authenticated, the techniques, at this point, may forgo blocks 814, 816, and 818 to permit access, login, or perform other acts for which authentication is required. Optionally, however, the techniques may require an additional layer of authentication. In such a case, the authentication received is sufficient to permit a second layer of authentication and the methods proceed to block 814.

Block 814 receives encrypted credentialing gestures based on the authentication of authentication identifiers. These can be received along with authentication at block 812 or otherwise. Block 816 decrypts the encrypted credentialing gestures to provide credentialing gestures. Block 818 then determines that the gestures are authentic, such as by comparison of the credentialing gestures and authentication gestures. Block 818 may do so using fuzzy comparison of the credentialing gestures and the authentication gestures made over the image or newly received authentication gestures, or in other manners.

Block 820 permits use of the device or access to the resource for which authentication was desired. Concluding the examples above, if a user performs authentication gestures for which identifiers match those of credentialing gestures, the user is logged on to her computing device 102 (unless additional authentication is performed, in which case she may still be logged on without further effort, should methods 800 determine that her authentication gestures matched the credentialing gestures).

The preceding discussion describes methods relating to gesture-based authentication without retained credentialing gestures. Aspects of these methods may be implemented in hardware (e.g., fixed logic circuitry), firmware, software, manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing mode by multiple computing devices. Further, the features described herein are platform-independent and can be implemented on a variety of computing platforms having a variety of processors.

These techniques may be embodied on one or more of the entities shown in FIGS. 1, 2, and 9 (device 900 is described below), which may be further divided, combined, and so on. Thus, these figures illustrate some of many possible systems or apparatuses capable of employing the described techniques. The entities of these figures generally represent software, firmware, hardware, whole devices or networks, or a combination thereof. In the case of a software implementation, for instance, the entities (e.g., credentialing module 110 and authentication module 112) represent program code that performs specified tasks when executed on a processor (e.g., processor(s) 206). The program code can be stored in one or more computer-readable memory devices, such as media 208 or computer-readable media 914 of FIG. 9.

Example Device

Figure 9:
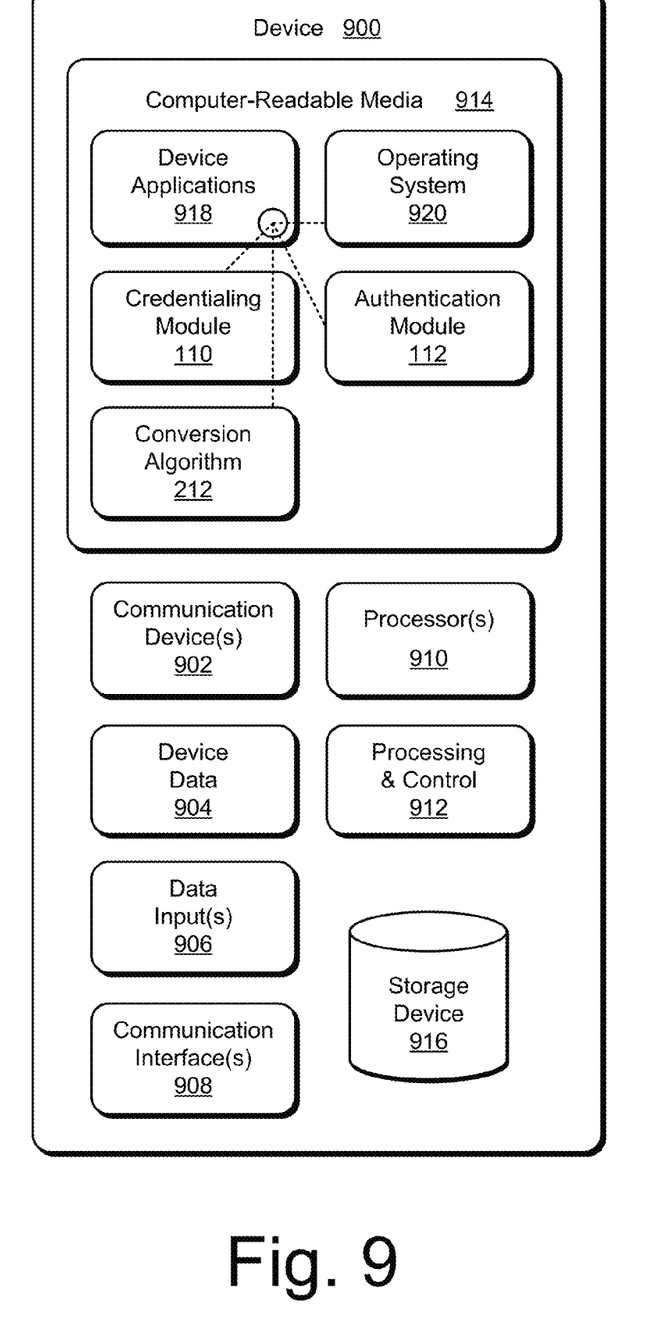
FIG. 9 illustrates an example device in which techniques enabling gesture-based authentication without retained credentialing gestures can be performed.

FIG. 9 illustrates various components of example device 900 that can be implemented as any type of client, server, and/or computing device as described with reference to the previous FIGS. 1-8 to implement techniques enabling gesture-based authentication without retained credentialing gestures. In embodiments, device 900 can be implemented as one or a combination of a wired and/or wireless device, as a form of television mobile computing device (e.g., television set-top box, digital video recorder (DVR), etc.), consumer device, computer device, server device, portable computer device, user device, communication device, video processing and/or rendering device, appliance device, gaming device, electronic device, System-on-Chip (SoC), and/or as another type of device or portion thereof. Device 900 may also be associated with a user (e.g., a person) and/or an entity that operates the device such that a device describes logical devices that include users, software, firmware, and/or a combination of devices.

Device 900 includes communication devices 902 that enable wired and/or wireless communication of device data 904 (e.g., received data, data that is being received, data scheduled for broadcast, data packets of the data, etc.). Device data 904 or other device content can include configuration settings of the device, media content stored on the device (e.g., audiovisual media), and/or information associated with a user of the device. Media content stored on device 900 can include any type of audio, video, and/or image data. Device 900 includes one or more data inputs 906 via which any type of data, media content, and/or inputs can be received, such as human utterances, user-selectable inputs, messages, music, television media content, recorded video content, and any other type of audio, video, and/or image data received from any content and/or data source.

Device 900 also includes communication interfaces 908, which can be implemented as any one or more of a serial and/or parallel interface, a wireless interface, any type of network interface, a modem, and as any other type of communication interface. Communication interfaces 908 provide a connection and/or communication links between device 900 and a communication network by which other electronic, computing, and communication devices communicate data with device 900.

Device 900 includes one or more processors 910 (e.g., any of microprocessors, controllers, and the like), which process various computer-executable instructions to control the operation of device 900 and to enable techniques enabling a user interface presenting a media reaction. Alternatively or in addition, device 900 can be implemented with any one or combination of hardware, firmware, or fixed logic circuitry that is implemented in connection with processing and control circuits which are generally identified at 912. Although not shown, device 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 900 also includes computer-readable storage media 914, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 900 can also include a mass storage media device 916.

Computer-readable storage media 914 provides data storage mechanisms to store device data 904, as well as various device applications 918 and any other types of information and/or data related to operational aspects of device 900. For example, an operating system 920 can be maintained as a computer application with computer-readable storage media 914 and executed on processors 910. Device applications 918 may include a device manager, such as any form of a control application, software application, signal-processing and control module, code that is native to a particular device, a hardware abstraction layer for a particular device, and so on.

Device applications 918 also include any system components, engines, or modules to implement techniques enabling gesture-based authentication without retained credentialing gestures. In this example, device applications 918 can include credentialing module 110, authentication module 112, or conversion algorithm 212.

CONCLUSION

Although embodiments of techniques and apparatuses enabling a gesture-based authentication without retained credentialing gestures have been described in language specific to features and/or methods, it is to be understood that the subject of the appended claims is not necessarily limited to the specific features or methods described. Rather, the specific features and methods are disclosed as example implementations enabling gesture-based authentication without retained credentialing gestures.

What is claimed is:

1. One or more computer-readable storage memory devices having computer-executable instructions thereon that, responsive to execution by one or more processors, perform operations comprising:
    enabling entry of credentialing gestures over an image;
    responsive to receiving first, second, and third credentialing gestures, determining, using a repeatable conversion algorithm, first, second, and third identifiers for the first, second, and third credentialing gestures, respectively, the first, second, and third identifiers:
        mapped to their respective credentialing gestures;
        capable, alone or in combination, of being cryptographically secured; and
        capable, on performance of the repeatable conversion algorithm for a future gesture, of being reproduced; and
    providing the first, second, and third identifiers to a remote entity comprising an authenticator effective to enable the remote entity comprising the authenticator to authenticate a user as part of a gesture-based user-authentication process.

2. One or more computer-readable storage memory devices as described in claim 1, wherein the operation of determining one of the identifiers determines a grid location and a shift, the shift and grid location mapped to a received location over the image, the shift being an offset from the received location of one of the credentialing gestures to a center of the grid location.

3. One or more computer-readable storage memory devices as described in claim 2, wherein a number of grid locations for the image is determined based on a size of the image.

4. One or more computer-readable storage memory devices as described in claim 1, wherein the operation of determining one of the identifiers determines a circle identifier for a circle credentialing gesture of the credentialing gestures, the circle identifier having a radius, a center grid location of the circle credentialing gesture, and a clockwise or counter-clockwise indicator.

5. One or more computer-readable storage memory devices as described in claim 4, further comprising determining a shift for the center grid location, the shift being an offset from a received center for the circle credentialing gesture to a center of the center grid location.

6. One or more computer-readable storage memory devices as described in claim 1, wherein the operation of determining the identifiers determines a line identifier for a line credentialing gesture of the credentialing gestures, the line identifier having a first grid location and a second grid location, and further comprising determining a shift, the shift being an offset from a first received location of the line credentialing gesture to a center of the first grid location.

7. One or more computer-readable storage memory devices as described in claim 1, wherein the operation of determining the identifiers determines a tap identifier for a tap credentialing gesture of the credentialing gestures, the tap identifier having a grid location, and further comprising determining a shift, the shift being an offset from a received location of the tap credentialing gesture to a center of the grid location.

8. One or more computer-readable storage memory devices as described in claim 1, wherein the image is a photograph having features, the features including a line feature and a circle feature, and wherein selection of at least two of the first, second, and third credentialing gestures receives selection of a line credentialing gesture received over the line feature and a circle credentialing gesture over the circle feature.

9. One or more computer-readable storage memory devices as described in claim 1 further comprising determining shifts for each of the first, second, and third credentialing gestures and, prior to providing the first, second, and third identifiers to the remote entity comprising the authenticator, encrypting one or more grid locations of the first, second, and third identifiers but not the shifts.

10. A computer-implemented method comprising:
    receiving, as part of a gesture-based user-authentication process, authentication gestures made over an image;
    retrieving shifts for each of the authentication gestures made over the image, the shifts associated with a user, device, or resource related to the gesture-based user-authentication process;
    determining authentication identifiers for each of the authentication gestures based on the shifts, the determining of the authentication identifiers shifting, for each of the authentication gestures, a received location based on a respective shift of the shifts to produce a grid location used for the authentication identifier;
    encrypting the authentication identifiers; and
    providing the encrypted authentication identifiers to a remote entity comprising an authenticator effective to enable the remote entity comprising the authenticator to authenticate the user, device, or resource using the authentication gestures made over the image.

11. A computer-implemented method as described in claim 10, further comprising:
    receiving authentication of the encrypted authentication identifiers from the remote entity comprising the authenticator along with encrypted credentialing gestures;
    decrypting the encrypted credentialing gestures to provide credentialing gestures;
    determining, using fuzzy comparison of the credentialing gestures and the authentication gestures made over the image, that the authentication gestures are authentic; and
    responsive to determining that the authentication gestures are authentic, permitting use of the device or resource.

12. A computer-implemented method as described in claim 10, wherein retrieving the shifts is performed in the clear.

13. A computer-implemented method as described in claim 10, wherein encrypting the authentication identifiers encrypts a concatenation of the authentication identifiers, the concatenation based on an order in which the authentication gestures associated with the authentication identifiers are received.

14. A computer-implemented method as described in claim 10, wherein:
the authentication identifiers are numeric;
the encrypting hashes the authentication identifiers; and
providing the encrypted authentication identifiers provides hashed authentication identifiers to the remote entity comprising the authenticator effective to enable the remote entity comprising the authenticator to authenticate by comparing the hashed authentication identifiers with stored, hashed credential identifiers of credentialing gestures on which the credential identifiers are based.

15. A computer-implemented method as described in claim 10, wherein one of the authentication gestures made over the image is a circle authentication gesture and determining the authentication identifier for the circle authentication gesture determines a center grid location of the circle authentication gesture using the shift, a clockwise or counter-clockwise direction that the circle authentication gesture is received, and a radius of the circle authentication gesture.

16. A computer-implemented method as described in claim 10, wherein one of the authentication gestures made over the image is a line authentication gesture and determining the authentication identifier for the line authentication gesture determines a first grid location based on the shift and a second grid location.

17. A computer-implemented method as described in claim 10, wherein one of the authentication gestures made over the image is a tap authentication gesture and determining the authentication identifier for the tap authentication gesture determines a grid location based on the shift.

18. A computer-implemented method as described in claim 10, wherein determining authentication identifiers for each of the authentication gestures based on the shifts permits the authentication identifiers to match credential identifiers calculated for previously received credentialing gestures where each of the authentication gestures is not identical to each of the credentialing gestures.

19. A computer-implemented method as described in claim 18, wherein a difference between one of the authentication gestures and one of the credentialing gestures is permitted that is equal to at least one half of a dimension of a grid location.

20. A system comprising:
one or more processors;
one or more computer-readable media having processor-executable instructions thereon that, responsive to execution by the one or more processors, perform operations comprising:
determining credential identifiers for multiple received credentialing gestures received over a personalized digital image associated with a user, the credential identifiers capable, alone or in combination, of being encrypted;
encrypting the credential identifiers;
providing the encrypted credential identifiers to a remote entity comprising an authenticator;
receiving authentication gestures made over the personalized digital image;
determining authentication identifiers for each of the authentication gestures based on non-encrypted shifts, the determining of the authentication identifiers shifting, for each of the authentication gestures, a received location based on a respective shift of the non-encrypted shifts to produce a grid location used for the authentication identifier;
encrypting the authentication identifiers; and
providing the encrypted authentication identifiers to the remote entity comprising the authenticator effective to enable the remote entity comprising the authenticator to authenticate the user based on the encrypted credential identifiers and the encrypted authentication identifiers.

* * * * *